A. CAPIROSSO.
ANCHOR HOOK.
APPLICATION FILED JULY 2, 1921.
1,419,016.
Patented June 6, 1922.
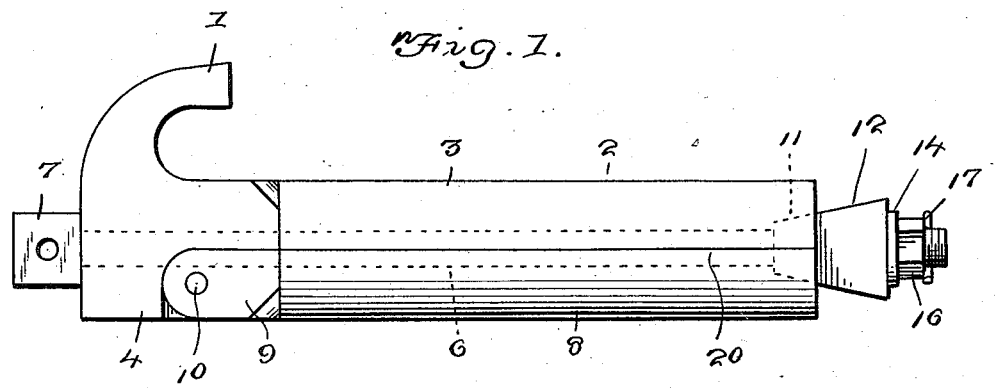
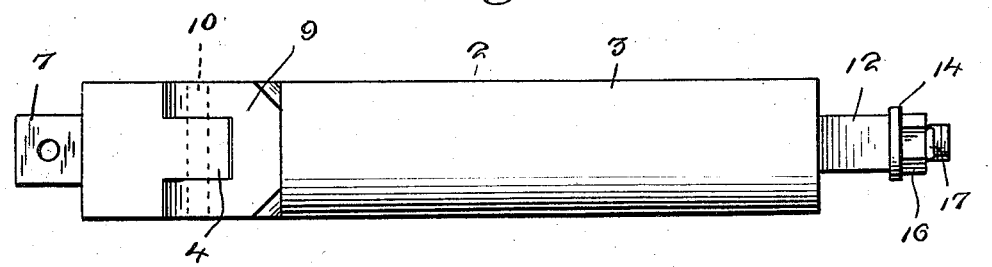
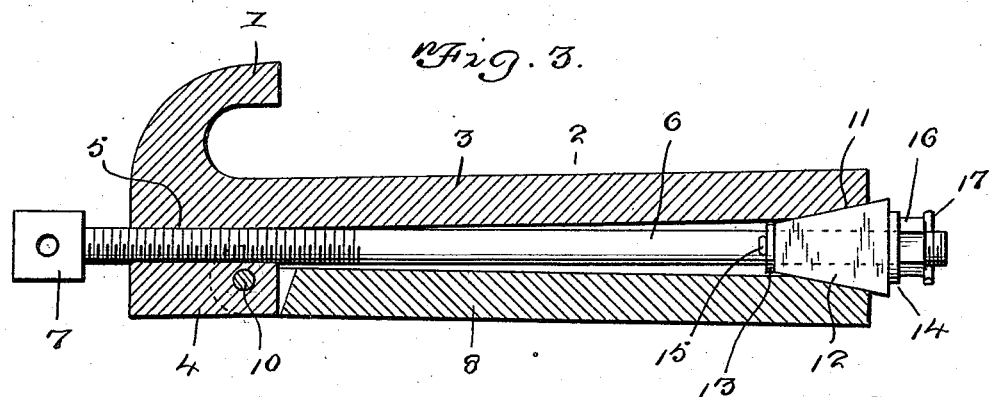
Witnesses:—
Hyman Berman
Lawrence Schlosser
Inventor,
ANGELO CAPIROSSO.
By Clarence A. O'Brien.
Attorney

UNITED STATES PATENT OFFICE.

ANGELO CAPIROSSO, OF ROSSITER, PENNSYLVANIA.

ANCHOR HOOK.

1,419,016.　　　　　Specification of Letters Patent.　　Patented June 6, 1922.

Application filed July 2, 1921. Serial No. 482,107.

*To all whom it may concern:*

Be it known that I, ANGELO CAPIROSSO, a citizen of the United States, residing at Rossiter, in the county of Indiana and State of Pennsylvania, have invented new and useful Improvements in Anchor Hooks, of which the following is a specification.

My present invention contemplates the provision of an improved and practically advantageous anchor hook for use more especially in coal mines, and in connection with the pulling of a coal cutting machine from one point to another in the mine.

The hook comprises a shank and means for positively expanding the shank so as to secure the shank of itself in a socket provided with a wall of bituminous coal or other substance.

To the attainment of the foregoing, the invention consists in the improvement as hereinafter described and definitely claimed.

In the accompanying drawings, forming part of this specification:—

Figure 1 is a side elevation of my novel anchor hook.

Figure 2 is an inverted plan view of the same.

Figure 3 is a longitudinal vertical section of the device with the wedge member and the wedge adjusting rod in elevation.

Similar numerals of reference designate corresponding parts in all of the views of the drawings.

Among other elements my novel anchor hook comprises a hook 1, of appropriate metal, and a shank 2 that is preferably, though not necessarily, of circular form in cross section.

A portion 3 of the shank 2 is integral with the hook 1 and is provided at one end with a longitudinal central lug 4 arranged at the opposite side of the shank portion, with reference to the hook 1. The said shank portion 3 is also provided in its outer portion and opposite the lug 4 with a threaded bore 5 for the engagement of the threaded portion of a rod 6 which is headed at its outer end as indicated by 7 to adapt it for the application of a wrench or the like.

It will also be noted by comparison of the figures that a portion of the shank 3 is formed by a member 8, bifurcated at 9, and pivotally connected at 10 to the lug 4. The inner or forward portions of the shank part 3 and the member 8 are tapered, as indicated by 11, conformably to and adapted to engage a wedge member 12, or said wedge member 12 being mounted on the rod 6 between washers 13 and 14 as best shown in Figure 3, and the washer 13 being arranged against a cotter pin 15 carried by the rod 6, and the washer 14 being retained in position by a nut 16 threaded on the rod 6, and a cotter pin 17 carried by the rod 6 and opposed to the washer.

In the practical use of my novel anchor hook it will be manifest that when the rod 6 swivelled in the wedge member 12 is turned to move it toward the right in Figure 3, the wedge member 12 will be moved in the same direction until the opposed edges 20 of the shank portions 3 and 8 are together as is shown in Figure 1. In this state the shank of the hook may be expeditiously and easily inserted in a socket formed in a wall of bituminous coal or the like and then when the rod 6 is moved in the opposite direction to move the said rod 6 through the threaded bore 5 toward the left in Figure 3, the corresponding movement of the wedge member 12 will operate to expand the shank of the hook and thereby strongly anchor or secure the same in a wall of coal or the like.

While designed more especially for the particular use hereinbefore indicated, my novel hook may be employed in any connection to which it is applicable without involving departure from the scope of my invention as claimed.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. An anchor hook comprising a hook and a shank portion and lug integral therewith and a longitudinal threaded bore extending through the hook, a bifurcated member hinged to the lug of the hook, said shank portion and member having opposed tapers in their inner end portions, a longitudinal threaded rod extending through said bore of the shank and headed at its outer end, and a wedge member swivelled on the rod and interposed and movable rectilinearly between said tapers of the shank portion and member.

2. A hook having a shank portion and a threaded bore, a shank member hinged to the hook, a wedge member interposed between said shank portion and member, and a longitudinal threaded rod bearing in said bore and on which the wedge member is swivelled.

3. A hook having a shank portion, a shank member hingedly connected to the hook, a wedge between the shank portion and member, and means cooperating with the hook and the wedge-member to move the latter rectilinearly.

In testimony whereof, I affix my signature.

ANGELO CAPIROSSO.